UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

PYROXYLIN COMPOUND.

SPECIFICATION forming part of Letters Patent No. 593,787, dated November 16, 1897.

Application filed July 22, 1897. Serial No. 645,513. (No specimens.)

*To all whom it may concern:*

Be it known that I, JOHN H. STEVENS, of the city of Newark, in the county of Essex and State of New Jersey, have invented a certain new and useful Composition of Matter, of which the following is a specification.

My new composition of matter relates to the mixtures or compositions known as "pyroxylin compounds," which consist of pyroxylin dissolved in or combined with solvents of the same and other materials to form compounds of consistencies varying from hard solids to thin liquids, depending on the amount and character of the solvent employed, as is well understood. The most prominent representatives of this class of substances are known by the name of "celluloid." These compositions are used in the arts mainly to imitate natural substances, like ivory, horn, amber, crystal, tortoise-shell, skin, parchment, and solutions which deposit films on exposure. On this account they should be permanent in quality, or resistant to chemical or other deleterious changes. The pyroxylin by itself is unstable and easily undergoes acid decomposition, and this property to a certain degree is imparted to its compounds. It has been the practice among the best-informed operators to secure the stability or permanency of pyroxylin compounds by the introduction of substances which possess an anti-acid power. This has been comparatively easy so far as opaque or translucent compositions are concerned, but it has been difficult to secure a high transparency with permanency, because the anti-acid substances introduced generally clouded the compound by reason of non-compatibility or failure to perfectly amalgamate with the compound.

By means of the present invention I am enabled to render pyroxylin and its compositions stable, or much less liable to decomposing influences than when they are not protected with anti-acid substances. These effects I secure by combining with the pyroxylin or its compounds the inorganic salt of urea known as "sulfate of urea."

I have made application for Letters Patent for the compound in which urea is employed, such application being known as Serial No. 529,603, filed November 22, 1894.

The present invention is distinct from the one in which urea is used, as urea sulfate is a salt of urea made by combining urea with sulfuric acid.

I have used urea because of its ability to combine with acids.

The present invention depends on my discovery that urea already saturated with sulfuric acid is capable of acting as an anti-acid and of preserving pyroxylin and its compounds.

In operating with urea sulfate I employ it in the same manner as urea is employed—that is, preferably dissolved in some menstruum which is used as the liquid solvent for the pyroxylin compound, grain-alcohol or wood-spirit, for instance. I form my solid or massive compositions according to the usual processes, and the spreading solutions or varnishes are made by the well-known methods. It is only necessary with the latter compounds to employ a solvent which will dissolve the necessary amount of urea sulfate.

I find that a very good proportion is two parts of the urea sulfate in each one hundred parts of the pyroxylin. More than this tends to discolor the compound, and less than this should only be used where the compound is not to be subjected to extraordinary heating, especially when dry. I would not advise using much less than one per cent. under any circumstances.

Urea-sulfate pyroxylin compositions are fully as transparent as pyroxylin compounds containing no antiacid substance whatever, and when made as I direct will be found of pale color and of good stability.

For the guidance of the operator in making these compositions or mixtures I give the solubility of urea sulfate in some of the prominent liquid solvents. The parts are by weight and approximately correct and were ascertained at ordinary temperatures. One part of urea sulfate dissolves in about one hundred parts of strong acetone, fifteen parts of absolute grain-alcohol, seven parts of ninety-five-per-cent grain-alcohol, seven parts of best wood-spirit, and two hundred and fifty parts of commercial acetate of amyl.

I am aware that nitrate of urea has been employed in connection with guncotton in the manufacture of explosive mixtures, and that one of the objects of its use was to preserve the compound against deleterious chemical changes; but while nitrate of urea makes stable explosives with nitrocellulose there is nothing publicly known as to its action in connection with the peculiarly unstable grade of pyroxylin employed in my compounds and the methods used in forming and manipulating them or as to its ability to produce transparent pyroxylin compositions having also the other qualities necessary to make them of value in commerce. In fact, I have ascertained by actual experience that among other unavailable related substances urea nitrate is an extremely undesirable ingredient of compositions like mine, as it discolors them, destroys delicate tints, and its compounds cannot be used in metal dies or in contact with the metal plates used in polishing these materials on account of the corrosive unstable character it imparts to these non-explosive or celluloid-like compounds.

While my urea-sulfate pyroxylin compositions are especially applicable as transparent compounds because of the possibility of securing high transparency, I do not confine myself strictly to the production of transparent compositions. Soluble pyroxylin itself can be rendered stable by combining it with the urea sulfate, preferably added to the pyroxylin in some solution (alcoholic, for instance) which will not show any solvent action on the pyroxylin.

This invention is confined to soluble pyroxylin and its products as distinguished from pyroxylin used for explosives and its products.

What I claim, and desire to secure by Letters Patent, is—

1. The new composition of matter consisting of soluble pyroxylin in combination with sulfate of urea, as described.

2. The process for rendering soluble pyroxylin compounds stable, which consists in introducing sulfate of urea into the compound as specified.

3. A new composition of matter consisting of soluble pyroxylin in combination with sulfate of urea and a solvent or solvents of pyroxylin, as set forth.

JOHN H. STEVENS.

Witnesses:
ABRAHAM MANNERS,
GEO. W. DOWNS.